No. 794,058. PATENTED JULY 4, 1905.
W. TILSNER.
VEHICLE WHEEL.
APPLICATION FILED DEC. 14, 1904.

2 SHEETS—SHEET 1.

Witnesses:
Hamilton D. Turner
Titus N. Irons

Inventor:
Wilhelm Tilsner
by his Attorneys:
Howson & Howson

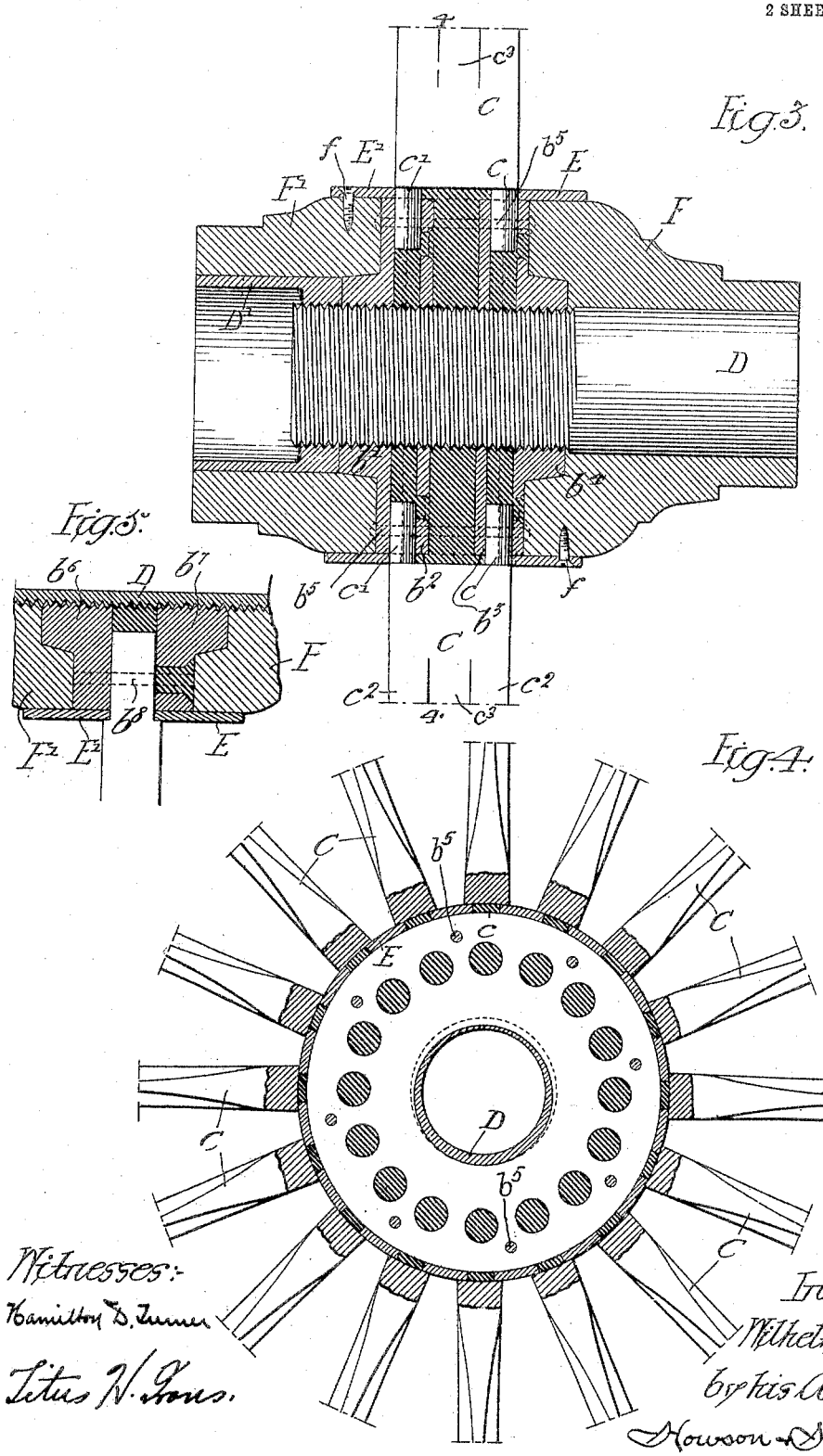

No. 794,058.

Patented July 4, 1905.

UNITED STATES PATENT OFFICE.

WILHELM TILSNER, OF PHILADELPHIA, PENNSYLVANIA, ASSIGNOR TO CHARLES FREIHOFER, OF PHILADELPHIA, PENNSYLVANIA.

VEHICLE-WHEEL.

SPECIFICATION forming part of Letters Patent No. 794,058, dated July 4, 1905.

Application filed December 14, 1904. Serial No. 236,831.

*To all whom it may concern:*

Be it known that I, WILHELM TILSNER, a subject of the Emperor of Germany, residing in Philadelphia, Pennsylvania, have invented certain Improvements in Vehicle-Wheels, of which the following is a specification.

The object of my invention is to provide a wheel which while being relatively inexpensive to construct shall under operating conditions be practically indestructible and of relatively great strength. These objects I attain as hereinafter set forth, reference being had to the accompanying drawings, in which—

Figure 2:
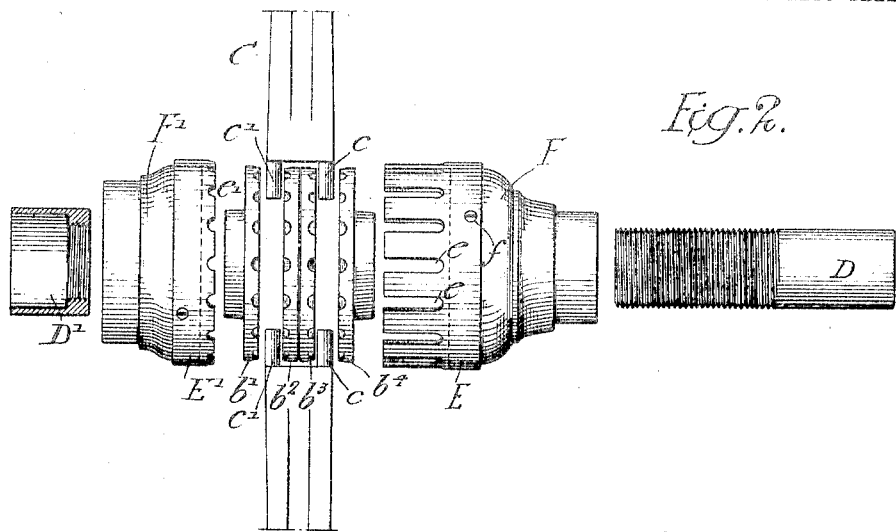
Figure 1:
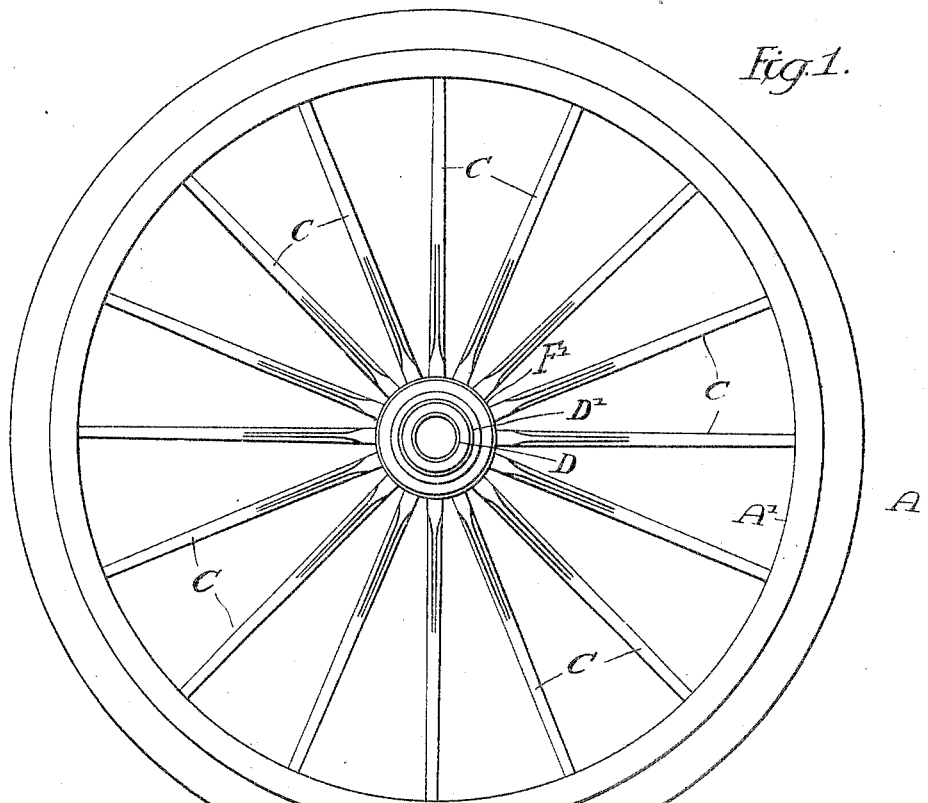

Figure 1 is a vehicle-wheel constructed according to my invention. Fig. 2 is an elevation showing the various parts comprising the hub of the wheel and their preferred arrangement relatively to the spokes. Fig. 3 is a sectional elevation of the hub of the wheel, further illustrating its detail construction. Fig. 4 is a sectional elevation of the central portion of the wheel, taken on the line 4 4, Fig. 3; and Fig. 5 is a special form of my invention.

While in Fig. 1 of the drawings I have illustrated the wheel as designed for the reception of a rubber tire A, it will be understood that this is immaterial, since such tire may be omitted and the wheel-felly made of the ordinary construction without departing from my invention.

Briefly, the invention may be described as consisting of a felly, a hub made in a number of parts, and spokes connecting said hub with the felly and brazed to both of these members, the brazing between the spokes and the hub being of such a nature that the various parts of the hub are inseparably connected to each other, as well as to said spokes.

Referring to Fig. 2, it will be seen that the hub consists, preferably, of four disks of metal $b'$, $b^2$, $b^3$, and $b^4$, arranged in pairs and, as shown in Fig. 3, provided with threaded openings through their centers. The adjacent faces of the disks comprising each pair are recessed radially for the reception of the end portions $c$ of the spokes C, in addition to which one disk of each pair—in the present instance the disks $b^2$ and $b^4$—is provided with a series of holes or openings extending through it and communicating with the recesses for the reception of the ends of the spokes. D is a tubular spindle provided with a threaded portion adapted to engage the threaded openings of the four disks, which latter are designed to be held in position thereon by means of a nut $D'$, also threaded to fit upon said spindle D. Two metallic rings E and E' are designed to fit over and around the outside of the disks, the first of said rings being provided with a number of indentations or slots $e$ of a width equal to or slightly larger than the diameter of the ends $c$ of the spokes and of such a length that when the ring E is placed in position over the disks, so that one set of the ends $c$ is in position at the bottom of the slots $e$, the edge of said ring in which said slots are cut extends substantially to a plane passing through the center lines of the second set of the ends $c$. The second ring E' is of the same diameter as the ring E and is also provided with slots $e'$, designed to fit around the second set of ends $c'$ of the spokes C, so that when the two rings are put together to form the hub each one of the slots $e$ will form, with a corresponding one of the slots $e'$, a single slot, through one extremity of which a spoke end $c$ passes, while at the opposite extremity the second end $c'$ of the same spoke extends. While said rings are preferably made as shown, they may, if desired, be made so that the recesses in them are of equal depths, as it is immaterial whether one ring has recesses of the same depth or of equal depth with those of the other ring.

In addition to the above parts, all of which are preferably made of metal, usually of iron, I provide wooden hub ends F and F', held in position by screws $f$ passing through the rings E and E' into said wooden pieces.

In assembling the parts of my improved vehicle-wheel the various spokes C are first loosely placed in the felly A' and then while their inner ends are temporarily moved out of the plane of the wheel the second disks $b^2$ and $b^3$ are also loosely placed in position between the various pairs of spoke ends $c'$ and $c$, to which they are then fitted. The exterior disks $b'$ and $b^4$ are then fitted over the outside faces of the disks $b^2$ and $b^3$, so as to inclose each spoke end in its respective recess formed by the disks and the whole structure held together by means of rivets $b^5$. The spindle D is now screwed through the four disks and is clamped in position by means of a nut D', and the outer rings E and E' are fitted over the disks and around the spoke ends, so as to occupy the positions shown in Fig. 3. The wheel is now laid in a substantially horizontal plane, and after suitable heating of the parts melted brass or other desired metal is poured into the interior of the ring E, from whence it flows through the openings in the face of the disks $b^4$ into the recesses formed in the disks $b^3$ and $b^4$ for the reception of the spoke ends $c$, from thence passing through suitable openings in the disk $b^3$ into a space between this disk and the disk $b^2$, and thence through the holes in the face of this latter disk to the recesses containing the spoke ends $c'$. Melted metal also fills those portions of the slots $e$ and $e'$ in the rings E and E' not occupied by the spoke ends and flows into contact with the tubular spindle D, so that when the whole structure has cooled off it practically consists of but a single piece of metal, since all its component parts are brazed together.

The various steps in the above-described assembling of parts are not necessarily accomplished in the order described, as, if found convenient, such order of operation may be departed from without affecting the end obtained. The felly A' is also brazed to the ends of the various spokes, which are preferably of a section which may be described as two substantially parallel flange or head portions $c^2$, united by a web $c^3$. In order to give the finished hub a proper appearance, it is provided with wooden end pieces F and F', as above noted, and may have inserted in the spindle D any desired form of box for the reception of the axle. The spokes are not necessarily made with two end portions, as, if desired, they may be used as shown in Fig. 5, with their inner ends extended between two disks $b^6$ and $b^7$, which are first held together by rivets $b^8$ and afterward brazed to the spokes and other parts of the structure, preferably made as illustrated.

I claim as my invention—

1. In a wheel, the combination of a felly, spokes fixed thereto, and a hub, said hub including a pair of disks each having recesses for the reception of the ends of the spokes, said disks being respectively on opposite sides of said ends, with a tubular spindle for said disks, said parts of the hub being brazed together, substantially as described.

2. In a wheel, the combination of a felly, spokes fixed thereto, and a hub, said hub including a pair of disks each having in one face a series of radially-extending recesses, the recesses of the two disks together forming a series of holes for the reception of the ends of the spokes, with brazing material uniting said disks and spoke ends, substantially as described.

3. In a wheel, the combination of a felly, spokes fixed thereto each provided with a plurality of projecting portions at its inner end, and a hub, said hub including a pair of disks for each set of end portions of the spokes, said disks having recesses for the reception of said end portions, and the members of each pair of disks being respectively on opposite sides of one set of spoke ends, with means for holding the disks together, substantially as described.

4. In a wheel, the combination of a felly, spokes fixed thereto, and a hub, said hub including a threaded spindle, a pair of disks screwed thereon, said disks having radial grooves in their adjacent faces, and the spokes having end portions adapted to fit said grooves, said parts of the hub being brazed together, substantially as described.

5. In a wheel, the combination of a felly, spokes fixed thereto, and a hub, said hub including an externally-threaded tubular spindle, a plurality of pairs of disks on said spindle, the disks of each pair having a series of radial grooves in their adjacent faces, and each of the spokes having two projecting portions on its inner end respectively fitting into the grooves of one pair of disks, with a body of brazing material holding all of said parts of the hub in position, substantially as described.

6. The combination in a hub, of a tubular spindle, a pair of disks threaded thereon having in their adjacent faces radial grooves, opposite pairs of said grooves forming cylindrical recesses for the reception of spoke ends, and a metallic casing extending around said disks having through it openings for the passage of spoke ends, with a body of brazing material for uniting the disks and spoke ends, and wooden end pieces at each extremity of the hub, substantially as described.

7. The combination in a hub, of a tubular spindle, a pair of disks threaded thereon having in their adjacent faces radial grooves, opposite pairs of said grooves forming cylindrical recesses for the reception of spoke ends, and a metallic casing extending around said disks having through it openings for the passage of spoke ends, with a body of brazing material mechanically connecting said parts of the hub, substantially as described.

8. The combination in a hub, of a tubular spindle, a plurality of pairs of disks screwed thereon, the disks of each pair having their adjacent faces radially grooved to form radial holes for the reception of spoke ends, with a two-part casing extending around said pairs of disks and provided with slots extending parallel with the hub-spindle to permit of the passage of spoke ends, the adjacent portions of the casing being of the same diameter and abutting each other, substantially as described.

9. The combination in a wheel, of a felly, spokes fixed thereto, each having two inwardly-extending end portions, two disks between the end portions of the various spokes, and two disks outside of said end portions, said disks being recessed for the reception of the end portions, a spindle passing through the disks, and a body of brazing material mechanically connecting all of the parts of the hub to each other and to the spoke ends, substantially as described.

10. In a wheel, the combination of a felly, spokes fixed thereto and each having two projections from its inner end, a pair of disks between the projections of the various spokes, a second pair of disks outside of said projections, a spindle extending through the disks, and a casing extending around the outside of the disks, said casing being slotted to permit of the passage of the spoke ends, with a body of brazing material mechanically connecting all of said parts to each other and to the spoke ends, substantially as described.

11. The combination in a wheel, of a felly, spokes fixed thereto, and a hub, said hub including a pair of disks, a threaded spindle screwed through said disks, a nut on said spindle, there being an end portion on each spoke extending between the disks, with brazing material mechanically connecting the parts of the hub to each other and to the spoke ends, substantially as described.

In testimony whereof I have signed my name to this specification in the presence of two subscribing witnesses.

WILHELM TILSNER.

Witnesses:
WILLIAM E. BRADLEY,
JOS. H. KLEIN.